United States Patent [19]
Slattery et al.

[11] Patent Number: 6,089,444
[45] Date of Patent: Jul. 18, 2000

[54] PROCESS OF BONDING COPPER AND TUNGSTEN

[75] Inventors: Kevin T. Slattery, St. Charles; Daniel E. Driemeyer, Manchester; John W. Davis, Ballwin, all of Mo.

[73] Assignee: McDonnell Douglas Corporation, St. Louis, Mo.

[21] Appl. No.: 08/921,581

[22] Filed: Sep. 2, 1997

[51] Int. Cl.$^7$ ........................................................ B05D 7/00
[52] U.S. Cl. ...................... 228/194; 228/198; 228/124.1; 228/262.6; 428/547; 428/550; 428/610
[58] Field of Search ..................................... 228/194, 198, 228/124.1, 262.6; 428/547, 550, 610; 419/5

[56] References Cited

U.S. PATENT DOCUMENTS

| | | | |
|---|---|---|---|
| 4,886,709 | 12/1989 | Sasame et al. ........................... | 428/552 |
| 5,126,102 | 6/1992 | Takahashi et al. ........................... | 419/2 |
| 5,705,283 | 1/1998 | Upadhya ................................. | 428/610 |

*Primary Examiner*—Samuel M. Heinrich
*Assistant Examiner*—M. Alexandra Elve
*Attorney, Agent, or Firm*—Westerlund & Powell, P.C.; Robert A. Westerlund; Ramon R. Hoch

[57] ABSTRACT

Process for bonding a copper substrate to a tungsten substrate by providing a thin metallic adhesion promoting film bonded to a tungsten substrate and a functionally graded material (FGM) interlayer bonding the thin metallic adhesion promoting film to the copper substrate. The FGM interlayer is formed by sintering a stack of individual copper and tungsten powder blend layers having progressively higher copper content/tungsten content, by volume, ratio values in successive powder blend layers in a lineal direction extending from the tungsten substrate towards the copper substrate. The resulting copper to tungsten joint well accommodates the difference in the coefficient of thermal expansion of the materials.

20 Claims, 1 Drawing Sheet

PROCESS OF BONDING COPPER AND TUNGSTEN

This invention was made under contract no. AC-3013 awarded by Sandia National Labs. The Government has certain rights to this invention.

BACKGROUND OF THE INVENTION

The present invention relates to bonding materials having different coefficients of thermal expansions, and more particularly, to an improved process for bonding copper to tungsten.

One of the difficulties in the fabrication and use of bonded joints of dissimilar materials is accommodating the differences in their respective coefficients of thermal expansion (CTE). CTE is also often referred to as the coefficient of linear expansion, and these terms have interchangeable meaning. The difference in CTE's of bonded materials can result in stresses being exerted at the bondline during thermal cycling and after joinder at elevated temperatures. These stresses can reduce the service life, and even cause failure of the joints. The joint failures are especially prone to occur during cool-down from the initial joining temperature or in the course of heat cycles during service.

An inter-metal bonding system of interest in nuclear fusion research in particular is that of copper to tungsten. As illustrated in FIG. 1, in the nuclear fusion research milieu, the application of copper-tungsten bonds generally involves joining an exterior surface of a water-cooled copper alloy heat sink 10 to a tungsten tile 12, referred to occasionally herein as "armor," to protect the copper alloy material constituting the heat sink 10 from the sputtering erosion and occasionally extreme temperatures that can be generated by the reactor. The copper heat sink 10 has interior water channels 11 that permit water to flow through the heat sink 10 for heat exchange and cooling purposes. Previously, a metal joint 13 has been made between the copper alloy heat sink 10 and the tungsten tile 12 by brazing or direct diffusion bonding techniques. Namely, a single layer of mixed copper and tungsten material has been brazed or diffusion bonded in-between the copper alloy heat sink 10 and the tungsten tile 12. However, according to the HANDBOOK OF CHEMISTRY AND PHYSICS, 56th Ed., CRC Press, Inc., Cleveland, Ohio, 1975, p. D-173, the coefficient of thermal expansion (at 25° C.) for tungsten is $4.5 \times 10^6 (° C.)^{-1}$ while the value for copper is $16.6 \times 10^6$. This considerable difference in the respective CTE's of copper and tungsten, if not adequately addressed, can set the stage for potential joint failures due to thermal stresses exerted on the structures during bonding of these materials.

For instance, brazed copper-tungsten joints are relatively thin intervening connection structures between the copper and tungsten bodies. This short joint distance hinders the ability of the joint to effectively spread out strain differences arising from differences in the copper and tungsten CTE's, which, in turn, aggravates thermal stresses. Similarly, a diffusion bond formed between the copper heat sink 10 and tungsten tile 12 by hot pressing at high temperature and pressure also results in a relatively narrow joint region between the respective substrates. For instance, a vacuum brazed layer joint may only be on the order of approximately 125 $\mu$m thick, while a direct diffusion bonded joint formed by hot pressing may be only approximately 25 $\mu$m thick.

SUMMARY OF THE INVENTION

The invention relates to a process for bonding a copper substrate to a tungsten substrate which prevents joint defects and failures from arising, such as due to the difference in the thermal coefficients of expansion of the substrates.

The inventive process effectively bonds a copper substrate to a tungsten substrate in this manner by providing a unique intervening joint system including a thin metallic adhesion promoting film in contact with the tungsten substrate and a functionally graded material (FGM) interlayer situated between the copper film and copper substrate. The FGM interlayer is formed by sintering a stack of individual copper and tungsten powder blend layers having progressively higher copper content/tungsten content, by volume, ratio values in successive powder blend layers in a lineal direction extending from the tungsten substrate towards the copper substrate.

As a consequence, a concentration gradient is formed in the (FGM) interlayer of the joint system in which the concentration of copper relative to tungsten steadily increases in the direction approaching the copper substrate while it steadily decreases in the direction approaching the tungsten substrate, and, a converse relationship applies to the tungsten concentration in the FGM interlayer. This functional grading of the concentrations of copper and tungsten in the joint between the two substrates provides a transition region for spreading out and attenuating the effects of the differences in the CTE's of the two substrates and thereby avoids an abrupt localized changeover in thermal properties at the joint. The thin metallic adhesion promoting film layer is used as a "glue" layer to promote bonding of the FGM interlayer stack per se to the tungsten substrate. The thin metallic film layer preferably is applied by techniques permitting uniform deposition in relatively thin thicknesses of less than 1 $\mu$m, such as by physical or chemical vapor deposition techniques. The thin metallic film layer material is preferably pure copper, although it can also be other pure metals such as, for example, chromium, nickel, platinum, palladium, cobalt, silver, tungsten, gold, or even alloys of two or more of these metals.

In one more particular embodiment, the inventive process includes the steps of:

fixedly depositing a thin film layer of copper on a surface of a tungsten body;

forming a joint interlayer by sequentially stacking a plurality of individual sublayers, wherein the sublayers each comprise blends of tungsten and copper powders, the sublayers having progressively higher Cu/W, by volume, ratio values in successive sublayers in a lineal direction extending from the tungsten substrate towards the copper substrate;

contacting the thin copper layer supported by the tungsten body with the joint interlayer, either during or after completing the step of stacking the copper-tungsten powder mixture sublayers, to form an intermediate assembly;

hot pressing the intermediate assembly effective to sinter the sublayers and unite them to the thin copper layer on the tungsten body; and bonding a copper body to the stack of sintered sublayers united to the tungsten body.

In a further embodiment, the intermediate assembly formed of the stacked plurality of individual Cu—W interlayer sublayers and thin metal film-coated tungsten tile is bonded and consolidated by thermomechanical processing, such as hot isostatic pressure (HIP) techniques, to densify the powder blend layers to a very low porosity. The step of bonding the copper body to the consolidated intermediate assembly is a solid-to-solid operation thereby allowing more process flexibility, which can be accomplished by hot pressing, such as HIP, to form a diffusion bond, or, alternatively, by brazing or soldering.

One advantage of the present invention is that only copper and tungsten materials are needed in forming the joint, which simplifies manufacturing. Also, a wide range of incrementally varying copper/tungsten formulations can be used in constructing the Cu/W functionally graded stack to further reduce the thermal stresses experienced at the juncture of a copper body and a tungsten body. Another advantage is that the powder layer can be formed over complex surface topographies and it can conform to areas of mismatch between the copper and the tungsten. Furthermore, the functionally graded stack material can be formed into sheets for covering large areas of tungsten substrates. Yet another advantage of the present invention is that by using diffusion bonding to attach the tungsten body bearing the Cu/W functionally graded stack, relatively low joining temperatures (e.g., 450–550° C.) can be used. These have the dual advantages of lowering joining stresses and also enabling the use of stronger and weldable precipitation-hardened copper alloys such as CuNiBe and CuCrZr. The process of the invention is generally applicable to joining copper (alloy) and tungsten structural substrates in a wide variety of settings, including in fusion reactor research and electronic applications.

For purposes of this invention, the terminology "copper", as used herein, can encompass elemental copper or copper alloys unless specified otherwise. The terminology "bonds" and variants thereof, means securely joining or uniting two or more separate bodies together to form an integral structure.

BRIEF DESCRIPTION OF THE DRAWINGS

These and various other features and aspects of the present invention will be readily understood with reference to the following detailed description read in conjunction with the accompanying drawings, in which.

The drawings are not necessarily to scale, as the thicknesses of the various layers are shown for visual clarity and should not be interpreted in a limiting sense unless otherwise indicated herein.

DETAILED DESCRIPTION OF THE OF THE INVENTION

Figure 1:
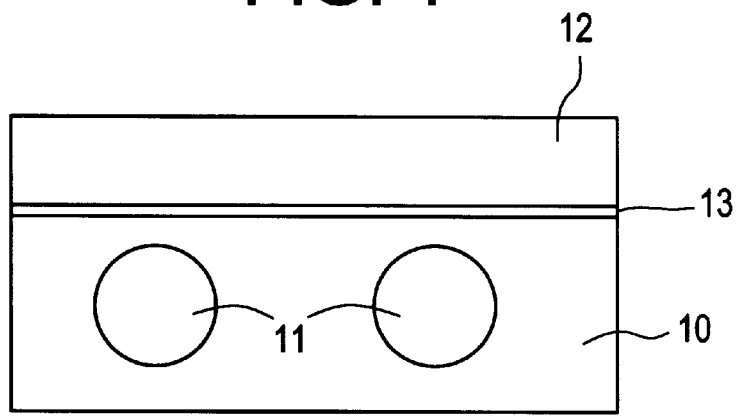
FIG. 1 is cross-sectional view of a copper alloy heat sink joined to a tungsten armor tile according to the prior art.
Figure 2:
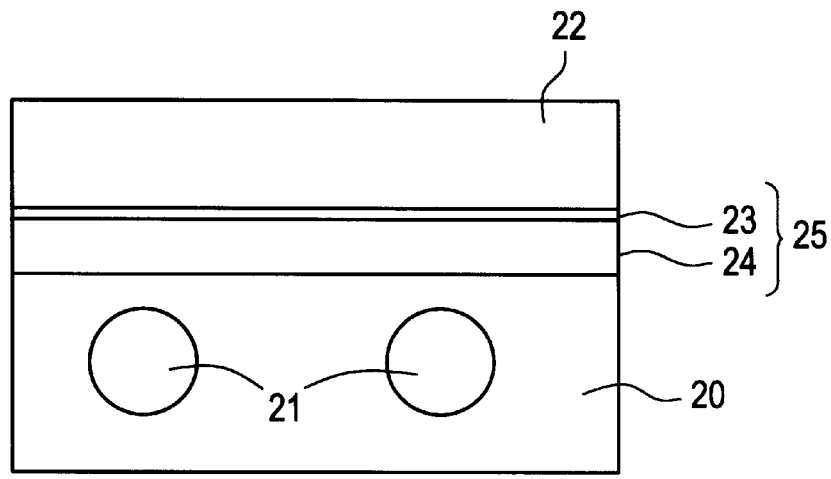
FIG. 2 is cross-sectional view of a copper alloy heat sink joined to a tungsten armor tile via the combined copper-tungsten functionally graded material interlayer and thin film adhesion layer according to the process of the present invention.

Referring now to the drawings, and particularly to FIG. 2, there is shown a representative portion of a completed copper to tungsten joint provided by the process of this invention. Namely, a functionally graded material (FGM) interlayer 24 is used in conjunction with a thin pure copper film 23 to form a joint system 25 between a tungsten tile body 22 and a copper alloy heat sink body 20. The tungsten tile 22 bears the thin pure copper layer 23 on a side confronting the consolidated stack of Cu—W sublayers 24, which stack has a progressively increasing fraction of copper content in a direction moving away from a tungsten tile 22 towards the copper alloy heat sink body 20. The copper-tungsten FGM interlayer 24 generally can be in the 0.5 to 5 mm thick range, preferably about 2 mm, which is much thicker than would be encountered in conventional brazed joints or direct diffusion bond joints. The functionally graded material (FGM) interlayer 24 reduces thermal stresses at the transition zone or joint 25 between the tungsten body 22 and copper body 20 having different CTE's by changing the relative amounts present of the two materials over the intervening distance represented by FGM interlayer 24. This avoids a relative abrupt transition at the joint. The copper heat sink 21 includes water channels 21 for permitting cooling water to flow in, through, and back out of the heat sink 20.

The first step of the inventive process is the depositing of the thin pure copper film 23 on the surface of the tungsten tile 22, which preferably is done so as to provide a copper thickness of less than 1 μm, more preferably 50 to 1,000 Å. The purpose of this thin pure copper layer 41 is to serve as adhesion promotion film between the tungsten body 22 and the FGM interlayer stack 24. If the thin pure copper film 23 is made too thin, it will not provide adequate adhesion, while, on the other hand, if it is made too thick, it my become subject to cohesive failure.

Although exemplified as copper material, it will be understood that other metallic materials that can be deposited in thin films could be used such as, for example, chromium, nickel, platinum, palladium, cobalt, silver, tungsten, gold, or even alloys of two or more of these metals.

The thin adhesion promoting film 23 can be deposited as a very thin, uniform layer by physical vapor deposition techniques, such as thermal evaporation or sputtering, chemical vapor deposition, ion plating, electroplating, plasma spraying, and the like. Sputtering is preferred. For example, a film of copper can be sputtered upon an exposed surface of the tungsten tile by ion bombardment of a copper target material. The sputtering process can be done by d.c. sputtering, radio frequency sputtering, or magnetron sputtering deposition. As known, a sputtering process is performed in a high vacuum system equipped with a target assembly and platens for holding the substrate, a tungsten tile in this invention, and preferably employs a magnetron. An inert gas, such as argon, helium, neon, krypton, or xenon, is introduced into a conventional sputtering system in the 1–10 mTorr range to provide the proper operating pressure. Either a rf voltage or a negative dc voltage is applied to the target to ignite a plasma (or a plasma igniter can be provided if needed), and creates a negative potential in the 1–10 keV range on the target with respect to the plasma. This voltage causes heavy ion bombardment, which, through momentum transfer, results in ejection of copper atoms from the target which deposit upon the surface of the tungsten tile. Sputtering provides excellent thickness uniformity and adhesion. Deposition rates from sputtering are relatively high, although the deposition rate for any given system must be empirically determined as understood in the art.

In the next process step, individual constituent sublayers 24a–24d of the functionally graded material (FGM) interlayer 24 are each prepared individually, then stacked one on the other for sintering and densification in situ during bonding of the stack to the copper coated-tungsten body. The individual FGM sublayers 24a–24d are formed by hand or by mechanically mixing copper and tungsten powders in desired proportions. Then, the binary powder mixtures are each cold-pressed into a shape adequate to cover the anticipated bond area to be established between the tungsten body 22 and the copper body 20. Although not necessarily required, it usually is preferable to form a surface area for each powder blend layer of the FGM interlayer 24 which will be co-extensive with the confronting surfaces of the tungsten and copper bodies to be joined. In any event, the FGM material is cold-pressed, such as at 240 MPa, into a convenient shape, e.g. a disc or rectangle, as needed. The pure copper and tungsten powders used for mixing and forming the FGM sublayers 24a–24d generally can have mean particle sizes (i.e., diameters) between about 5 to 100 $\mu$m. If the particle sizes are too small, the cold-pressed FGM layers tend to be more porous or structurally fragile, which is undesirable. The tungsten and copper particles used need not be the same size. For instance, 60 to 80 $\mu$m tungsten powder can be mixed with 30 to 50 $\mu$m copper powder to provide cold-pressed FGM sublayers with adequate structural integrity for handling and low or no porosity.

Figure 3:
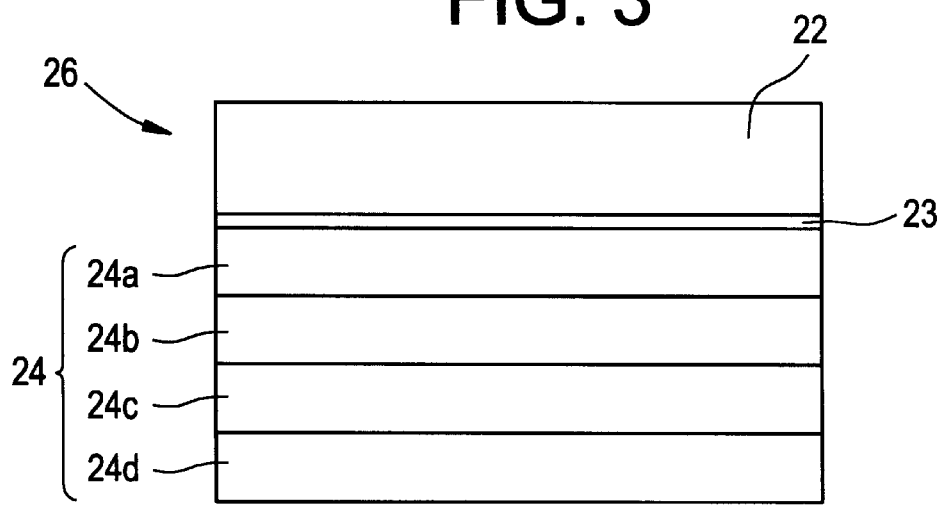
FIG. 3 is an enlarged cross-sectional view of an intermediate assembly structure of the process of the present invention illustrating the functionally graded material interlayer stack and copper adhesion film used as the joint system.

Then, additional, e.g., two or three or even more, FGM sublayers are formed in the same manner except with incremental, progressive changes in the relative amounts of Cu and W in each FGM sublayer. For example, as shown in FIG. 3, four FGM sublayers 24a–24d can be prepared having 20% by volume incremental changes in the fraction of tungsten, with a first FGM sublayer 24a having a 20 vol. %/80 vol. % Cu/W mixing ratio abutting the thin copper layer 23 deposited on tungsten tile 22 in a previous step, a second FGM sublayer 24b having a 40 vol. %/60 vol. % Cu/W mixing ratio abutting the first FGM sublayer 24a, a third FGM sublayer 24c having a 60 vol. %/40 vol. % Cu/W mixing ratio abutting the second FGM sublayer 24b, and finally a fourth FGM sublayer 24d having a 80 vol. %/20 vol. % Cu/W mixing ratio abutting the third FGM sublayer 24c on its top surface.

There is no particular limitation on the number of FGM sublayers used in this manner to construct the overall FGM interlayer 24 as long as the criteria is satisfied that the FGM sublayers progressively contain higher contents of copper relative to the tungsten content in a direction moving away from the tungsten body towards the copper body. Although the provision of a constant incremental change in the mixing proportions of the tungsten and copper from one FGM sublayer to adjoining FGM sublayer is thought optimal, it is not necessarily required as long as the above-mentioned general criteria is satisfied. The overall thickness of the FGM interlayer lay up 24, prior to sintering, generally can range from 0.5 to 5 mm, more preferably 1.5 to 2.5 mm. After sintering, the FGM interlayer 24 preferably has a densified thickness of approximately 0.5 to 1.0 mm.

The cold-pressed FGM sublayers 24a–24d can have a porosity of approximately 20–40%. Once sintered, as described below, it is desired to reduce this porosity in the FGM sublayers to below 10%, preferably below 1%. Also, while it is preferred to employ a binary mixture of copper and tungsten powders only to prepare FGM sublayers, it is within the contemplation of this invention to include one or more additional powder types in a powder blend, such as Ni, Be, Cr and/or Zr. For instance, where the heat sink 20 is a CuNiBe or CuCrZr copper alloy material, Ni, Be, Cr, and/or Zr powders can be added to the Cu—W powder blends for the FGM sublayers 24a–24d to further refine the compositional gradient and transition in the CTE between the copper heat sink 20 and the tungsten tile 22.

In any event, once the stack of FGM sublayers 24a–24d are laid up upon the copper layer 23 on the tungsten body 22, this intermediate assembly 26 is consolidated by hot pressing using, for example, hot isostatic pressing (HIP) at 1000–1050° C. and applying 105 MPA or greater pressure for 240–960 minutes, to unite the FGM sublayers 24a–24d to the copper faced side of the tungsten body 22. The lay up of tungsten body 22 and FGM sublayers 24a–d should be placed in a can or comparable restraining means effective to restrain the lateral surfaces of the FGM layers during the hot pressing process. The HIP process is implemented using an autoclave-like system in which the can holding the intermediate assembly is placed within an airtight pressure vessel which is filled with argon or other inert gas and the interior of the reaction vessel is heated to a very high temperature and brought to a very high pressure to compress the tile 22, copper film, 23 and FGM interlayer stack 24 together. The hot pressing action effectively sinters the FGM sublayers 24a–d and unites them via the copper film 23 to tungsten tile body 22 to form a resulting consolidated subassembly.

Then the consolidated intermediate subassembly is removed from the can and the exterior (outermost) FGM sublayer 24d is put into contact with a surface of the copper body 20. Hot pressing, preferably, hot isostatic pressing (HIP) at 450° C. or greater and at 105 MPA or greater pressure for 180–240 minutes, is employed to unite the tungsten body 22 to the copper body 20 via the joint system comprised of the intervening FGM Cu—W material interlayer 24 and thin copper layer 23. Alternatively, brazing, such as Cu—Mn, Cu—Ti, or Ag-based vacuum or flux braze, or soldering, can be used to join the copper body 20 to the FGM Cu—W material interlayer 24 borne by the tungsten body 22.

Although presently preferred embodiments of the present invention have been described in detail hereinabove, it should be clearly understood that many variations and/or modifications of the basic inventive concepts herein taught, which may appear to those skilled in the pertinent art, will still fall within the spirit and scope of the present invention, as defined in the appended claims.

For example, although this invention has been exemplified in the context of uniting a tungsten armor tile to a water-cooled copper alloy heat sink, such as used for fusion reactor research, it will be appreciated that this invention has other potential applications. For example, in the electronics industry, copper(copper alloy)/tungsten bonds that are more tolerant of thermal stresses could be used to advantage for making heat sinks whose coefficient of thermal expansion could exactly meet that of semiconductors.

What is claimed is:

1. A process for bonding a copper substrate to a tungsten substrate, comprising providing a thin metallic adhesion promoting film bonded to a tungsten substrate and a functionally graded material (FGM) interlayer bonding said thin metallic adhesion promoting film to a copper substrate, wherein said FGM interlayer is formed by sintering a stack of individual copper and tungsten powder blend layers having progressively larger copper content/tungsten content, by volume, ratio values in successive powder blend layers in a lineal direction extending from a side of the interlayer facing said tungsten substrate towards an opposite side of the interlayer upon which the copper substrate is bonded.

2. A process for bonding a copper body to a tungsten body, comprising the steps of:

(a) fixedly depositing a thin adhesion promoting film layer having a thickness less than 1 $\mu$m and comprising copper on a surface of a tungsten body;

(b) forming a joint interlayer by sequentially stacking a plurality of individual interlayer sublayers, wherein said sublayers each comprise blends of tungsten and copper powders, and said sublayers having progressively larger Cu/W, by volume, ratio values in successive sublayers in a lineal direction extending from a first side of the interlayer towards an opposite second side of said interlayer;

(c) contacting said first side of said interlayer with said thin adhesion promoting film layer supported by said tungsten body with said interlayer, either concurrent with or after step (b), to form an intermediate assembly;

(d) hot pressing said intermediate assembly effective to sinter said sublayers and join said sublayers of said interlayer to said thin adhesion promoting film layer on said tungsten body; and (e) bonding a copper body to said second side of said interlayer joined to said tungsten body.

3. The process of claim 2, wherein said tungsten body is a tile.

4. The process of claim 2, wherein said copper body is a heat sink.

5. The process of claim 2, wherein said copper body comprises a copper alloy.

6. The process of claim 2, wherein said hot pressing of step (d) comprises hot isostatic pressing.

7. The process of claim 2, wherein said bonding of step (e) comprises a joining operation selected from the group consisting of hot pressing, brazing, and soldering.

8. The process of claim 2, wherein said bonding of step (e) comprises hot isostatic pressing.

9. The process of claim 2, wherein said thin adhesion promoting film layer is formed by physical vapor deposition.

10. The process of claim 9, wherein said thin adhesion promoting film layer is formed by sputtering.

11. The process of claim 9, wherein said thin adhesion promoting film layer is formed by thermal evaporation.

12. The process of claim 2, wherein said thin adhesion promoting film layer is formed by chemical vapor deposition.

13. The process of claim 2, wherein said thin adhesion promoting film layer has a thickness between about 50 Å and 1 $\mu$m.

14. The process of claim 2, wherein said thin adhesion promoting film layer has a thickness between about 50 to 1,000 Å.

15. The process of claim 2, wherein said interlayer has a thickness of from 0.5 to 5.0 mm after step (b) and prior to step (d).

16. The process of claim 2, wherein said interlayer is formed with a thickness of approximately 0.5 to 1.0 mm after step (d).

17. A process of claim 2, further comprising, prior to said stacking in step (b), a step where said individual interlayer sublayers are formed by cold pressing said blends of tungsten and copper powders.

18. The process of claim 2, wherein said tungsten powder comprises mean particle sizes between about 5 to 100 $\mu$m and said copper powder comprises mean particle sizes between about 5 to 100 $\mu$m.

19. A process for bonding a copper body to a tungsten body, comprising the steps of:

(a) fixedly depositing a thin adhesion promoting film layer having a thickness less than 1 $\mu$m on a surface of a tungsten body, wherein said thin adhesion promoting film layer comprises a metal selected from the group consisting of chromium, nickel, platinum, palladium, cobalt, silver, tungsten, gold, and combinations thereof;

(b) forming a joint interlayer by sequentially stacking a plurality of individual interlayer sublayers, wherein said sublayers each comprise blends of tungsten and copper powders, and said sublayers having progressively larger Cu/W, by volume, ratio values in successive sublayers in a lineal direction extending from a first side of the interlayer towards an opposite second side of said interlayer;

(c) contacting said first side of said interlayer with said thin adhesion promoting film layer supported by said tungsten body with said interlayer, either concurrent with or after step (b), to form an intermediate assembly;

(d) hot pressing said intermediate assembly effective to sinter said sublayers and join said sublayers of said interlayer to said thin adhesion promoting film layer on said tungsten body; and (e) bonding a copper body to said second side of said interlayer joined to said tungsten body.

20. The process of claim 19, further comprising, prior to said stacking in step (b), a step where said individual interlayer sublayers are formed by cold pressing said blends of tungsten and copper powders.

\* \* \* \* \*